United States Patent
Chen et al.

(10) Patent No.: US 10,771,335 B2
(45) Date of Patent: Sep. 8, 2020

(54) GENERATING AND SHARING MODELS FOR INTERNET-OF-THINGS DATA

(71) Applicant: Verizon Patent and Licensing Inc., Arlington, VA (US)

(72) Inventors: Ming Chen, Bedford, MA (US); Ira C. Stevens, III, New Boston, NH (US); Zhong Chen, Acton, MA (US); Matthew J. Threefoot, Columbia, MD (US)

(73) Assignee: Verizon Patent And Licensing, Inc., Basking Ridge, NJ (US)

( * ) Notice: Subject to any disclaimer, the term of this patent is extended or adjusted under 35 U.S.C. 154(b) by 290 days.

(21) Appl. No.: 15/657,716

(22) Filed: Jul. 24, 2017

(65) Prior Publication Data

US 2019/0028349 A1   Jan. 24, 2019

(51) Int. Cl.
*H04L 12/24* (2006.01)
*H04L 29/12* (2006.01)
*G06Q 10/06* (2012.01)

(52) U.S. Cl.
CPC ...... *H04L 41/0866* (2013.01); *H04L 41/0856* (2013.01); *H04L 41/145* (2013.01); *G06Q 10/067* (2013.01); *H04L 61/2007* (2013.01)

(58) Field of Classification Search
CPC ............ H04L 41/0866; H04L 41/0856; H04L 41/145; H04L 61/2007; G06Q 10/067; G06Q 10/06
See application file for complete search history.

(56) References Cited

U.S. PATENT DOCUMENTS

| | | | |
|---|---|---|---|
| 2006/0070933 A1* | 4/2006 | Bennett | B07C 7/04 209/702 |
| 2008/0155535 A1* | 6/2008 | Daniels | G06Q 10/06 718/1 |
| 2011/0041073 A1* | 2/2011 | Hoff | G06F 16/90324 715/741 |
| 2017/0213004 A1* | 7/2017 | Fox | G06F 19/3418 |
| 2017/0238168 A1* | 8/2017 | He | H04L 29/06 455/411 |
| 2019/0138318 A1* | 5/2019 | Yang | H04W 4/70 |

* cited by examiner

*Primary Examiner* — Joshua D Taylor

(57) ABSTRACT

A network device stores capability designations associated with Internet-of-Things (IoT) devices and receives, from a customer device, one or more of the capability designations associated with a first type of IoT device. The network device receives event data generated by the first type of IoT device and maps the event data to the one or more of the capability designations. The mapping produces normalized IoT data for the first type of IoT device. The network device generates semantic information for the normalized IoT data and assembles a device model for the first type of IoT device. The device model includes the one or more of the capability designations and the semantic information.

20 Claims, 10 Drawing Sheets

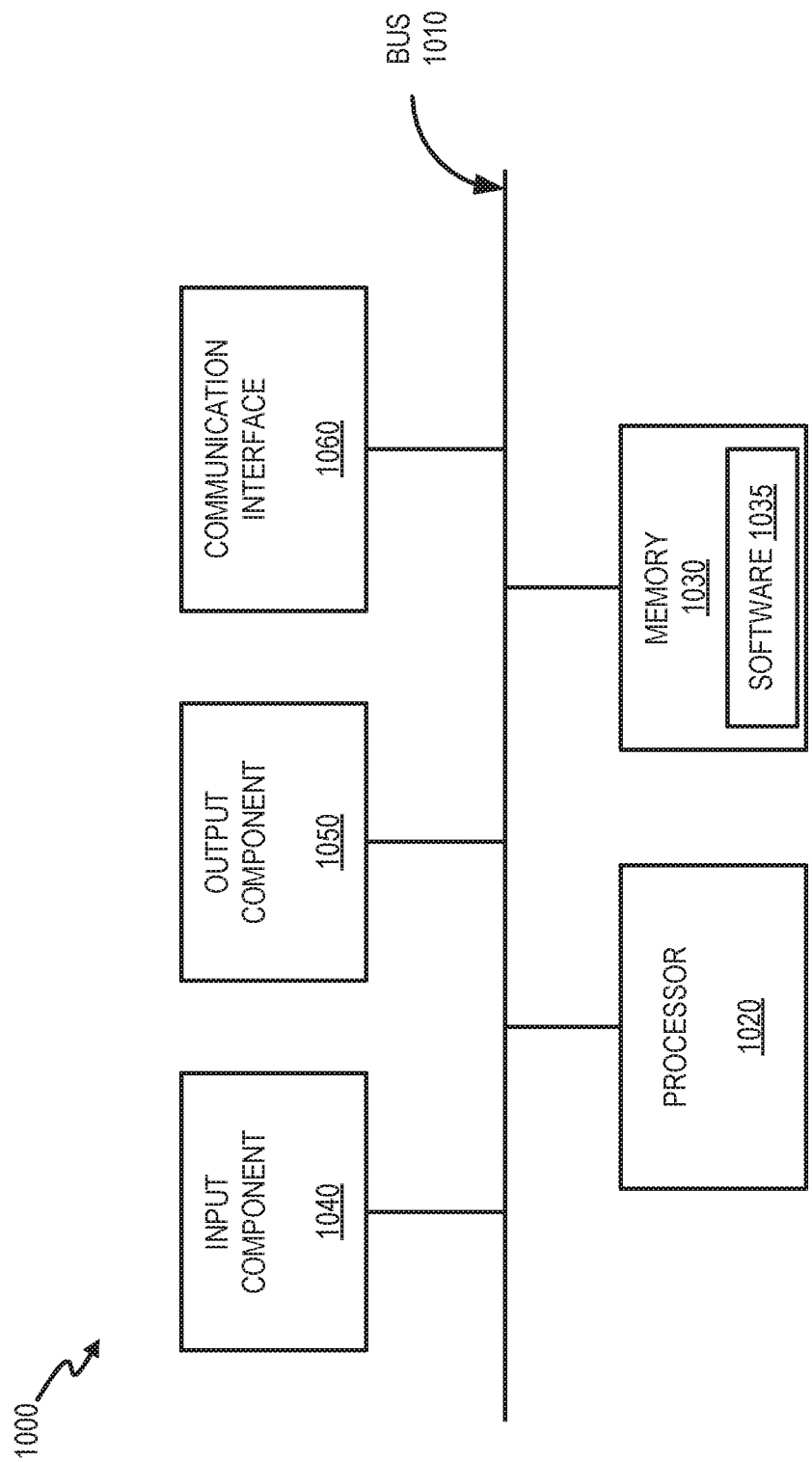

GENERATING AND SHARING MODELS FOR INTERNET-OF-THINGS DATA

BACKGROUND

The Internet of Things (IoT) may be described as a network of physical objects or "things" embedded with various types of electronics, software, sensors, logic, circuitry, etc., that can collect and exchange data. A "thing" (referred to herein as an "IoT device" or, alternatively, a "machine-type communication (MTC) device") may connect to a service hosted on the Internet indirectly (e.g., via another network device, such as a coordinator, a gateway, etc.) or directly. Since IoT technology has nearly limitless applications that can be leveraged to form new and useful services, interest among service providers and developers in IoT technology continues to increase. In many instances, IoT data is useful to individual consumers for monitoring, alerts, historical trends, etc., related to individual devices. In other cases, IoT data can be used by the device makers or service entities associated with each IoT device for monitoring their products or services. Data models may provide a structure for organizing, interpreting, and/or applying IoT data. For example, data models may be used for managing and retrieving observations and metadata from IoT devices.

BRIEF DESCRIPTION OF THE DRAWINGS

FIG. 10 is a diagram of exemplary components that may be included in one or more of the devices shown in FIG. 1.

DETAILED DESCRIPTION OF THE PREFERRED EMBODIMENTS

The following detailed description refers to the accompanying drawings. The same reference numbers in different drawings may identify the same or similar elements.

The Internet-of-Things (IoT) environment provides massive amounts of data. IoT devices may collect and provide data related to health, property, activity, environment, and the like (referred to herein as IoT data). However, IoT data—and particularly consumer IoT data—is generally fragmented and disconnected from other IoT data. For example, similar types of IoT data may be represented with different formats, terminology, measurement units, etc., and/or used for different purposes.

A service provider for IoT data may collect and store IoT data for customers. A customer may be, for example, a device manufacturer or developer for an IoT device. Customers may use data from IoT devices to support applications, provide monitoring services, and numerous other uses. Different IoT devices may provide different types of data. A device model may be defined in the service provider platform to govern how data for the IoT device is collected, stored, and/or presented.

According to implementations described herein, customers may define a dynamic data model for a particular type of IoT device. The dynamic model may include a compilation of capabilities associated with the IoT device. When defining the dynamic model, a customer may select capabilities from a published listing of device capabilities identified by a service provider. A capability may include a basic device function, for example, such as temperature sensing, location sensing, biometric sensing, video recording, etc., defined in one or more fields assigned by the service provider. One or more capabilities may be associated with semantic information to create a model. The dynamic data model may be accessible only to a particular customer account and may be changed as data is collected over time and as capabilities are added to the model. Incoming event data from IoT devices can be mapped to capabilities to normalize the incoming data. According to another implementation, dynamic data models may be submitted for certification and, if approved, included in the service provider platform as a global (e.g., non-dynamic) device model for public use.

Figure 1:
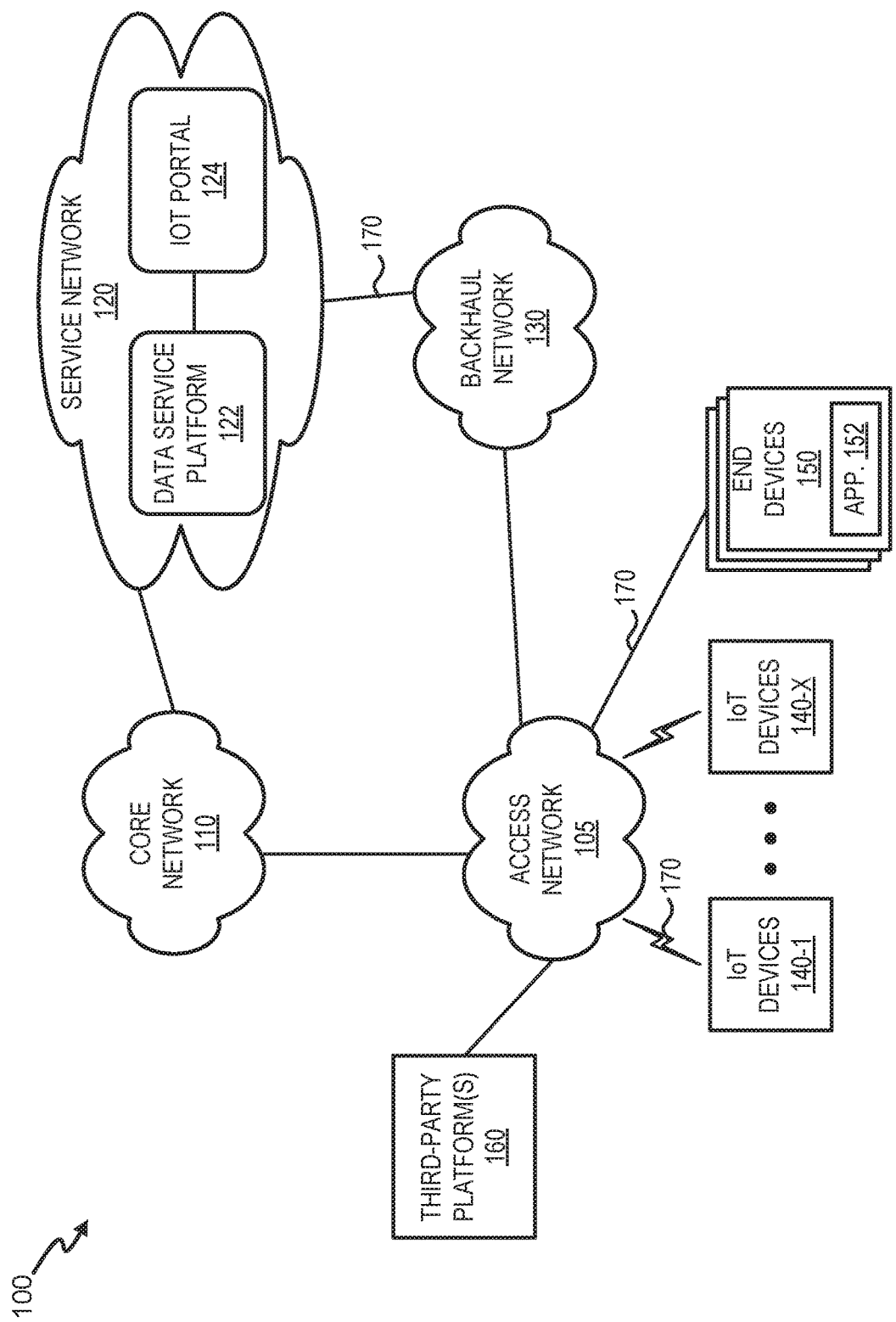
FIG. 1 is a diagram that depicts an exemplary network environment in which systems and methods described herein may be implemented.

FIG. 1 is a diagram that depicts an exemplary network environment 100 in which systems and methods described herein may be implemented. As illustrated, environment 100 may include an access network 105, a core network 110, a service network 120, and a backhaul network 130. Service network 120 may have multiple network elements including, but not limited to, a data service platform 122 and an IoT portal 124. Environment 100 may also include IoT devices 140-1 through 140-X (also referred to as collectively as "IoT devices 140" and, individually or generically as "IoT device 140"), end devices 150, and third-party platforms 160.

As further illustrated, environment 100 includes communicative links 170 between the network elements and networks (although only three are referenced in FIG. 1 as a links 170-1, 170-2, and 170-3). A network element may transmit and receive data via link 170. Environment 100 may be implemented to include wireless and/or wired (e.g., electrical, optical, etc.) links 170. A communicative connection between network elements may be direct or indirect. For example, an indirect communicative connection may involve an intermediary device or network element, and/or an intermediary network not illustrated in FIG. 1. Additionally, the number, the type (e.g., wired, wireless, etc.), and the arrangement of links 170 illustrated in environment 100 are exemplary.

A network element may be implemented according to a centralized computing architecture, a distributed computing architecture, or a cloud computing architecture (e.g., an elastic cloud, a private cloud, a public cloud, etc.). Additionally, a network element may be implemented according to one or multiple network architectures (e.g., a client device, a server device, a peer device, a proxy device, and/or a cloud device).

The number of network elements, the number of networks, and the arrangement in environment 100 are exemplary. According to other embodiments, environment 100 may include additional network elements, fewer network elements, and/or differently arranged network elements, than those illustrated in FIG. 1. For example, there may be multiple data service platforms 122, IoT platforms 124, and so forth. Additionally, or alternatively, according to other embodiments, multiple network elements may be implemented on a single device, and conversely, a network element may be implemented on multiple devices. In other embodiments, one network in environment 100 may be combined with another network.

Access network 105 may include one or multiple networks of one or multiple types. For example, access network 105 may be implemented to include a terrestrial network, a satellite network, a wireless network, and/or a wired network. According to an exemplary implementation, access network 105 includes a radio access network (RAN). The RAN may be a Third Generation (3G) RAN, a Fourth Generation (4G) RAN, a 4.5G RAN, a future generation wireless network architecture (e.g., a Fifth Generation (5G) RAN), etc. By way of further example, access network 105 may include an Evolved Universal Mobile Telecommunications System (UMTS) Terrestrial Radio Access Network (E-UTRAN) of a Long Term Evolution (LTE) network or LTE-Advanced (LTE-A) network, a U-TRAN, a UMTS RAN, a Global System for Mobile Communications (GSM) RAN, a Wideband Code Division Multiple Access (WCDMA) RAN, an Ultra Mobile Broadband (UMB) RAN, a High-Speed Packet Access (HSPA) RAN, an Evolution Data Optimized (EV-DO) RAN, or the like. Depending on the implementation, access network 105 may include various network elements, such as a base station (BS), a Node B, an evolved Node B (eNB), a BS controller, a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 may include one or multiple networks of one or multiple types. For example, core network 110 may be implemented to include a terrestrial network, a satellite network, a wireless network, and/or a wired network. According to an exemplary implementation, core network 110 includes a complimentary network pertaining to the one or multiple RANs described above. For example, core network 110 may include the core part of an LTE network, an LTE-A network, etc. Depending on the implementation, core network 110 may include various network elements, such as a gateway, a support node, a serving node, a router, a switch, a bridge, as well other network elements pertaining to various network-related functions, such as billing, security, authentication and authorization, network polices, subscriber profiles, etc.

Service network 120 includes one or multiple networks of one or multiple types. For example, service network 120 may include the Internet, the World Wide Web, an Internet Protocol (IP) Multimedia Subsystem (IMS) network, a cloud network, a wide area network (WAN), a metropolitan area network (MAN), a service provider network, a private IP network, some other type of backend network, and so forth. As illustrated, according to an exemplary embodiment, service network 120 includes data service platform 122 and IoT portal 124. According to other exemplary embodiments, data service platform 122, IoT portal 124, and/or a portion thereof may be implemented in core network 110.

Data service platform 122 includes one or more network devices that provide an IoT data service. The IoT data service includes receiving all packets that are transmitted by IoT devices 140 and implementing device models to collect, store, and/or present event data from IoT devices 140. Upon receipt of the packets, the IoT data service inspects each packet, identifies data that is authorized (e.g., by consumers that have registered and opted in) to be collected. The IoT data service provides data normalization, aggregates the IoT data with other IoT data, and may link the IoT data to other data to generate a data model. According to an implementation, data service platform 122 may store a catalog of capability designations, which customers may select to assemble models for IoT devices. Data service platform 122 is described further in connection with FIG. 2 below.

Still referring to FIG. 1, according to an exemplary embodiment, IoT portal 124 include one or more network devices that provide IoT management services. Users of IoT portal 124 may manage (e.g., configure, issue commands, update, monitor, etc.) IoT devices 140 and device models (e.g., dynamic data models) via end devices 150. According to an implementation, IoT portal 124 may include a network device that provides an interface to an IoT device model service. The IoT device model service allows customers to register devices and design device models for different types of IoT devices. IoT portal 124 is described further in connection with FIG. 3 below.

As further shown in FIG. 1, backhaul network 130 includes one or multiple networks of one or multiple types. According to an exemplary implementation, backhaul network 130 includes a backbone network. For example, the backbone network may be implemented as an optical transport network or other suitable architecture. According to an exemplary implementation, backhaul network 130 provides a connection path to service network 120. For example, IoT device 140 may transmit IoT data to data service platform 122 via access network 105 and backhaul network 130 using a Non-Access Stratum (NAS) control channel. According to an exemplary implementation, when access network 105 is implemented as an LTE RAN or an LTE-A RAN, backhaul network 130 may directly connect to an eNB. According to such an architecture, the IoT data transmitted using the NAS control channel may not traverse network elements of a complimentary part of core network 110.

According to an exemplary embodiment, IoT device 140 includes logic to collect, obtain, and/or generate IoT data as a part of an IoT device service. For example, IoT device 140 may be implemented to include various technologies, such as a sensor, a tag, a camera, an antenna, etc., that collects, obtains, and/or generates IoT data. According to various implementations, IoT device 140 may be a stationary device or a mobile device (e.g., an IoT device 140 attached to a drone, a mobile IoT device, an IoT device embedded or attached to a living organism (e.g., an animal or a person), etc.). IoT device 140 may include a component (e.g., a Global Positioning System (GPS) chipset, etc.) that provides location-aware functionality. IoT device 140 may be powered by an internal source, an external source, a battery, an outlet, electromagnetic waves, and so forth.

According to an exemplary embodiment, IoT device 140 includes a communication interface via which IoT device 140 can transmit and receive data. According to an exemplary embodiment, the communication interface includes an LTE and/or an LTE-A modem (referred to herein as "LTE modem"). The LTE modem transmits and receives data using an LTE NAS control channel as a part of the IoT device service and the IoT data service. According to an exemplary implementation, the LTE NAS control channel can be used to transport small payloads (e.g., 256 bytes or less). For example, IoT device 140 may transmit IoT data to data service platform 122 as a part of an IoT data service and receive data from IoT portal 124 as a part of an IoT management service. According to another implementation, IoT device 140 may transmit IoT data to data service platform 122 via backhaul network 130.

According to other embodiments, the communication interface of IoT device 140 includes a modem other than the LTE modem and IoT device 140 transmits and receives data using conventional or well-known communication technologies other than the LTE NAS control channel. Thus, IoT device 140 may communicate with service network 120 via access network 105, core network 110, and/or backhaul network 130 via the communication interface. IoT device 140 may also communicate with local devices (not illustrated) using various short-range communication technologies. For example, IoT device 140 may obtain IoT data from a sensor.

According to an exemplary embodiment, IoT device 140 includes logic that supports the IoT services. For example, IoT device 140 includes logic to interpret and execute a command via an application program interface (API) call, which is received via the communication interface. IoT device 140 may also include logic that allows for identifying an API when performing the function or operation of the API call. According to implementations described herein, each IoT device 140 may be registered with service network 120. Registration may indicate an IoT device owner, an IoT device ID, an IoT device certificate, an IoT device IP address, etc. The registered IoT devices 140 may also be passed through an onboarding process, which ensures that each IoT device 140 has the necessary software (or firmware) loaded for security, modeling, and best practice to maximize network performance.

End device 150 may include a communicative and computational device. End device 150 may be implemented as a mobile device, a portable device, or a stationary device. For example, end device 150 may be implemented as a smartphone, a tablet, a computer (e.g., a laptop, a desktop, a palmtop, etc.), a personal digital assistant, a terminal, and so forth. According to an exemplary embodiment, end device 150 provides users with access to IoT portal 124. For example, end device 150 includes a client application 152, such as a web browser or other suitable software application. Users may be considered an operator of end devices 150. For example, a user may be a network administrator, a customer, an IoT device manufacturer, a third party (e.g., a vendor, a merchant, a potential customer), and so forth.

Third-party platform 160 may include one or more communicative and computational device for a standards body/repository. Third-party platform 160 may include, for example, an interface to allow users to submit device models for approval by IoT standardization groups.

Link 170 provides a communication path between network elements and/or networks of environment 100. Link 170 may have certain characteristics, such as bandwidth capacity, transmission data rate, and the like.

Figure 2:
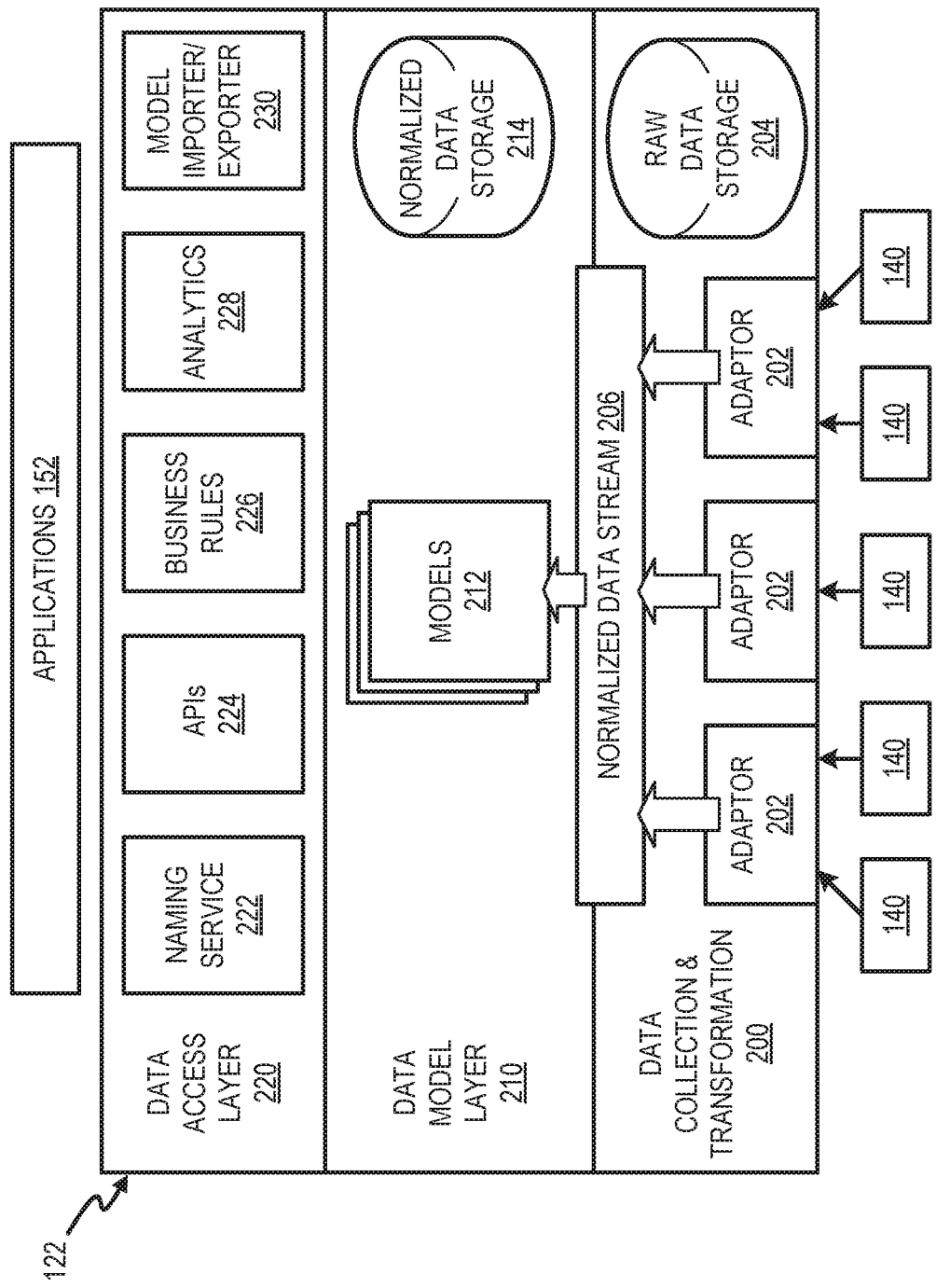
FIG. 2 is a diagram of exemplary network elements and interactions of the data service platform of FIG. 1.

FIG. 2 is a diagram of exemplary network elements and interactions of the data service platform 122. As illustrated in FIG. 2, data service platform 122 may include a data collection and transformation unit 200, a data model layer 210, and a data access layer 220. Data collection and transformation unit 200, data model layer 210, and data access layer 220 may be connected to and communicate with each other via a hardware link (e.g., a data bus, a system bus, a control bus, etc.), a software link (e.g., an API, inter-process communication (IPC), etc.) or an inter-network device link (e.g., link 170).

Data collection and transformation unit 200 may collect, filter, and normalize data from IoT devices 140. Data collection and transformation unit 200 may include adaptors 202 and raw data storage 204.

Adaptors 202 may receive raw data from IoT devices 140 and generate a normalized data stream 206 for use by data model layer 210. According to an exemplary embodiment, each adaptor 202 includes logic that identifies packets, such as packets carrying IoT data. Adaptor 202 may collect IoT data from consumers that have opted in to provide IoT data. For example, adaptor 202 may identify data from IoT devices 140 that have been previously registered and opted in to permit IoT data collection. In one implementation, adaptor 202 may receive IoT data forwarded directly from IoT devices 140. Adaptor 202 may filter data and reject data packets or individual data fields within packets that have not been previously authorized.

Adaptor 202 also includes logic to collect and store IoT data that is authorized for collection. Adaptor 202 stores authorized data in raw data storage 204. Raw data storage 204 may include a repository (e.g., a database, a data structure, etc.). In one implementation, raw data storage 204 may include a dedicated memory that is accessible to adaptors 202, but may not be accessible to unauthorized platforms or APIs available for third-party use.

Adaptor 202 also includes logic to perform data normalization. For example, filtered data from IoT devices 140 may be converted into a universal format. As data formats of the filtered IoT data or raw data storage 204 may vary depending on data sources, adaptor 202 may translate various data formats into a unified syntax for further use by, for example, data model layer 210. In one implementation, adaptor 202 may include a table or another data structure to cross-reference similar data fields used by different types of IoT devices 140. The table may be updated to reflect new data formats, for example, at the time of IoT device 140 registrations or partner registrations with services network. Filtered, normalized data from adaptors 202 may be output to data model layer 210 as normalized data stream 206.

Data model layer 210 may include multiple data models 212 and normalized data storage 214. Each data model 212 may apply selected data from normalized data storage 214 to a schema. For example, a data model 212 may apply capability data from normalized data storage 214 to assemble models within particular parameters. In one implementation, normalized data storage 214 may include a repository (e.g., a database, a data structure, etc.) that is separate from raw data storage 204.

Data access layer 220 may provide services to allow customer applications (e.g., applications 152 of end devices 150) to access data in data service platform 122. Data access layer 220 may include, for example, a naming service 222, APIs 224, business rules 226, analytics 228, and a model importer/exporter 230. Naming service 222 may associate data with particular models and searches. APIs 224 may include APIs to provide access to data and data models. In one implementation, APIs 224 may include representational state transfer (RESTful) APIs to access data models. Business rules 226 may include policies to control access, regulate, and promote use of data models in data model layer 210. Analytics 228 may provide data analytics for data in data model layer 210, including machine learning, data set analysis, cluster resource management, etc. Model importer/exporter 230 may import and export data models for data model layer 210. For example, model importer/exporter 230 may interface with IoT portal 124 to bring in customer device models for use by data model layer 210.

Figure 3:
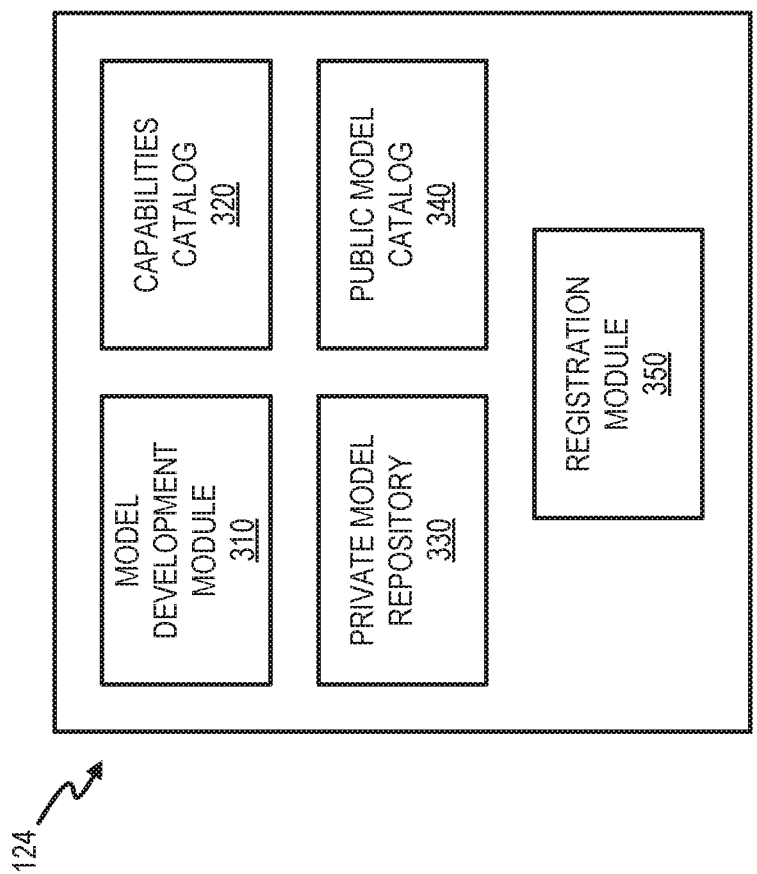
FIG. 3 is a diagram of exemplary network elements of the IoT portal of FIG. 1.

FIG. 3 is a diagram illustrating exemplary functional elements of IoT portal 124. For example, as illustrated, IoT portal 124 may include a model development module 310, a capabilities catalog 320, a private model repository 330, a public model catalog 340, and a registration module 350. According to other exemplary embodiments, IoT portal 124 may include additional, fewer, and/or different elements than those illustrated in FIG. 3 and described herein. Each of model development module 310, capabilities catalog 320, private model repository 330, public model catalog 340, or registration module 350 may provide a graphical user interface that allows a user (e.g., a user of end device 150) to use the various services and perform various tasks as described herein.

According to an exemplary embodiment, model development module 310 includes logic that provides an IoT model development service. Model development module 310 may provide a user interface to generate a device model (e.g., model 212). According to implementations described herein, a device model may include two levels of construction, base models and capabilities.

A device model can include one or more base models, which means the device model will inherit all fields from its base models. Each base model can have a list of complex and/or basic capabilities. In an embodiment, each capability will only be included once in a device model definition. According to one aspect, a device model must have at least one field either via inheriting base models or composing capabilities.

A capability represents a basic device (e.g., IoT device 140) function and can have multiple fields. Basic capabilities have may undefined semantic attribute and can be used in models. Object capabilities may have type value as an "object" and can have multiple fields with a basic type (defined in place) or can reference other complex capabilities.

For example, model development module 310 may provide users (e.g., of end device 150) access to capabilities catalog 320. Users may map data fields from IoT devices 140 to a capability designation (also referred to herein simply as a capability) from capabilities catalog 320. Selected capabilities designations may be used by adaptors 202 to normalize incoming data. The capability designations in capabilities catalog 320 may be used by users to develop device models and/or register an IoT device 140. Capabilities catalog 320 may be included, for example, within a database or other storage that can be cross-referenced using model development module 310. Given the array of various IoT devices 140 available and corresponding IoT data to be obtained, the catalog of capabilities may be proportionally large. For example, IoT devices 140 may include cameras to capture images in public places, video cameras to capture video and audio in public places, location chips to collect location data pertaining to vehicles (e.g., cars, busses, subways, trains, etc.), mobile phones to collect location data pertaining to the mobile phones and/or the end users, health and fitness devices to collect health monitoring data, environment stations to collect indoor/outdoor conditions, and so forth.

According to implementations described herein, each capability in capabilities catalog 320 may include a unique capability identifier, which may be used, for example, when IoT devices 140 respond to API calls and initiate IoT data transfers. Examples of simple capabilities may include integers, Boolean indicators, strings, numbers, etc., associated with an event type such as temperature, speed, time, humidity, battery life, audio file, interval, etc. Other capabilities may have multiple fields, such a location capability that includes accuracy, address, altitude, latitude, longitude, event time, etc.

Private model repository 330 may include data models for access by a particular customer. Private models may be available only to users of the customer's account. In one implementation, models in private model repository 330 may include dynamic models, which a customer may alter the capabilities in the model to achieve a desired output.

Public model catalog 340 may include data models for access by any customer (e.g., any customer of the service provider). For example, models in public model catalog 340 may include models submitted by customers and approved by a standards body, as described further herein.

Registration module 350 may register users and/or IoT devices 140 for access to IoT data services (e.g., services to retrieve, process, and package IoT data) from services network 120. For example, registration module 350 may provide a user interface (e.g., a web-based interface) to enable a user of IoT devices 140 to associate a user account with particular IoT devices 140 and/or particular device models. Registration module 350 may, for example, solicit user credentials (e.g., a client ID and password) for a user's wireless or home network account. Upon receipt of the user credentials, registration module 350 may solicit details for a profile of the IoT device 140. The profile may include indications of particular data types that a consumer's IoT device 140 will provide (e.g., including capabilities selected from capabilities catalog 320) and may associate the particular data types with a unique identifier for the IoT device 140. When the profile is completed, registration module 350 may then activate data collection for the particular IoT device 140 by adaptor 202.

Figure 4:
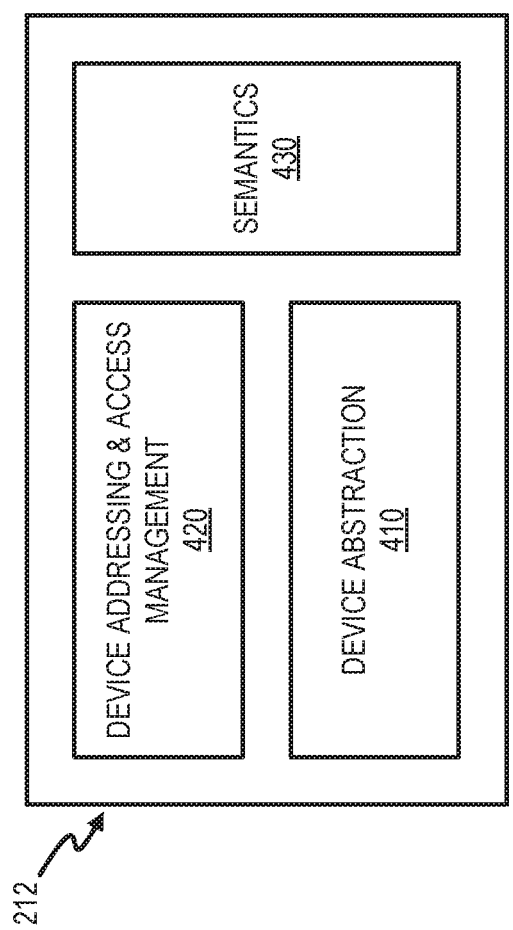
FIG. 4 is a diagram of exemplary logical aspects of the device model of FIG. 2.

FIG. 4 is a block diagram illustrating exemplary logical aspects of device model 212. As shown in FIG. 4, device model 212 may include a device abstraction component 410, a device addressing and access management component 420, and a semantics component 430.

Generally, device model 212 provides a vehicle to support the convergence of external addressing/access management and internal device data normalization. Device abstraction component 410 may receive normalized data (e.g., normalized data 206). In one implementation, a data exchange format such as JavaScript Object Notation (JSON) or protocol buffers (PROTOBUF), may be used to provide normalized data 206. Device abstraction component 410 may organize data by capabilities. Device addressing and access management component 420 may generally associated an IoT device or group of devices with a network address, such as a static IP address. In another implementation, device addressing and access management component 420 may provide another identifier and associate IoT device 140 with a pool of dynamically assigned IP addresses.

Semantics component 430 may apply semantics information derived based on data analysis. Semantics may include context such as associations with other capabilities, data ranges, frequency of reporting, etc. to determine how capabilities are associated with an IoT device. In one implementation, semantics component 430 may be derived from batch data (collected over periodic intervals) or meta data to determine semantics for a particular type of device. In another implementation, semantics component 430 may be processed from real-time streams of normalized data. Semantics component 430 may communicate with one or more other devices in service network 120 (e.g., analytics 228) that perform data analytics. In one implementation, semantics information from semantics component 430 may be used differentiate device models with the same or similar capabilities designations.

Figure 5:
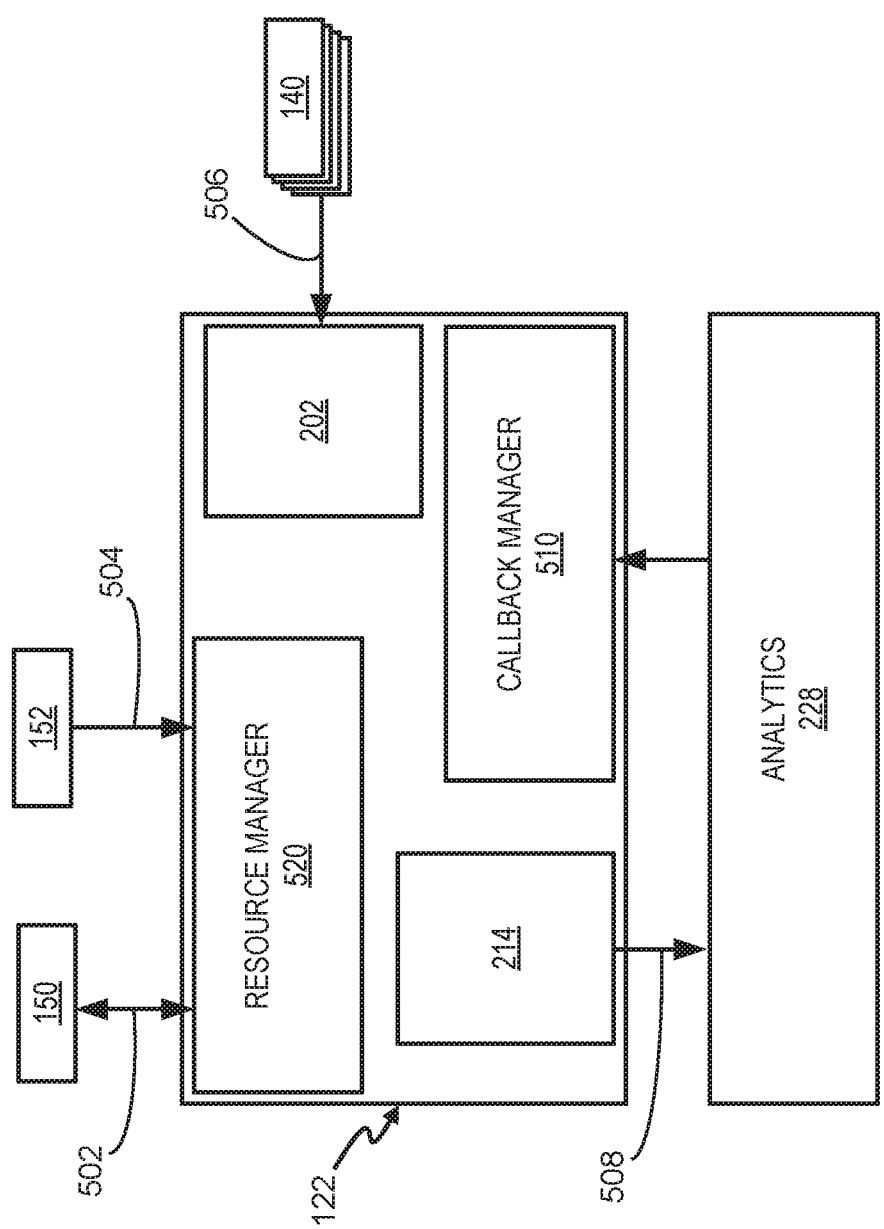
FIG. 5 is a block diagram illustrating communications for creating a device model among components in a portion of the data service platform of FIG. 1.

FIG. 5 is a block diagram illustrating communications for creating a device model among components in a portion of data service platform 122.

As shown in FIG. 5, a resource manager 520 may communicate with end devices 150 and/or applications 152. For example, resource manager 520 may receive, from end devices 150, configuration information 502, such as IoT device registration information, model syntax information, and data formats for IoT devices 140. Applications 152 may provide, for example, API calls 504 or other requests to resource manager 520 to obtain data reports, models, etc. from IoT device data.

IoT devices 140 may provide raw data to adaptor 202. For example, IoT devices 140 may provide an IoT data stream 506 to data service platform 122. IoT data stream 506 may be provided in a customer format (e.g., not normalized) that includes capabilities associated with the IoT data and other metadata. Adaptor 202 may normalize the IoT data stream 506 by mapping capabilities. Resource manager 520 may provide formatting to support global addressing, search, and access by users; and store the formatted data in normalized data storage 214.

Analytics module 228 may retrieve 508 data from normalized data storage 214 for analysis. For example, analytics module 228 may augment capabilities assigned to data in IoT data stream 506 with semantics information. As a simple illustration, a device with capability "temperature" with outdoor location and data reading in the range of ambient temperature may be detected as a weather monitoring temperature sensor.

Figure 6:
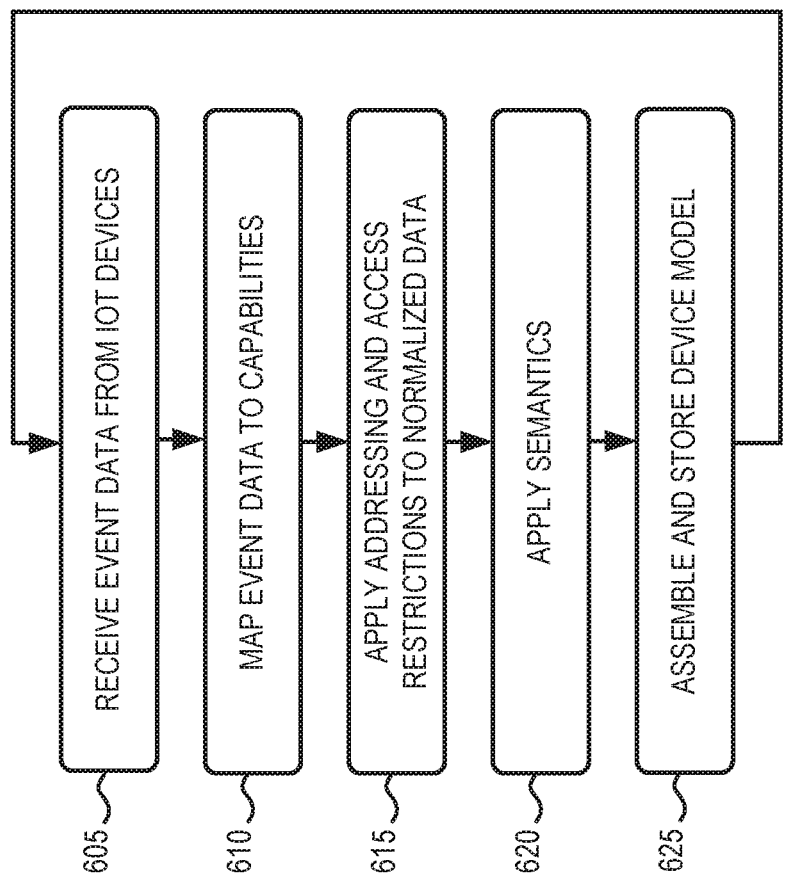
FIG. 6 is a flow diagram illustrating an exemplary process for creating a device model, according to an implementation described herein.

FIG. 6 is a flow diagram illustrating an exemplary process 600 for creating a device model. In one implementation, process 600 may be implemented by devices in data services platform 122. In another implementation, process 600 may be implemented by devices in data services platform 122 in conjunction with one or more other devices in network environment 100, such as one or more devices in service network 120. The process of FIG. 6 may generally be initiated by a customer using a developer mode when creating new models for IoT devices.

Process 600 may include receiving event data from IoT devices (block 605). For example, event data from a registered IoT device 140 may be provided to data service platform 122 (e.g., adaptor 202). In one implementation, the event data may include one or more designated capabilities (e.g., temperature, speed, pulse, etc.), such as a capability identifier and one or more fields associated with the capability identifier. Capabilities may include basic capabilities (e.g., a single data value) or complex capabilities (e.g., multiple data values).

Process 600 may also include normalizing, by the network device, the event data to include a uniform format (block 610). For example, data service platform 122 may map incoming event data to one or more capabilities to normalize the data.

Process 600 may further include applying addressing and access restrictions to the normalized data (block 615). For example, event data from one type of IoT device 140 may be assigned to a particular network address/location for access by a customer. In one implementation, the event data may have restricted access.

Process 600 may additionally include applying semantics to the normalized data (block 620), and assembling and storing a device model (block 625). For example, data analytics unit 228 may combine metadata and event data from IoT devices 140 to derive semantics information and group capabilities to a device model. The device model is, thus, a collection of capabilities with semantic meaning. The device model may be stored, for example, in a privately accessible memory for a customer. In one implementation, data analytics unit 228 may provide semantic meaning updates to the device model as event data from IoT devices 140 continues to be populated. For example, adaptors 202 may continue to provide normalized data stream 206 after an initial device model is assembled and stored. Data analytics unit 228 may continue to derive semantics information from normalized data stream 206 or normalized data storage 214. Thus, the device model may be updated periodically or dynamically based on analysis of continuing event data.

Figure 7:
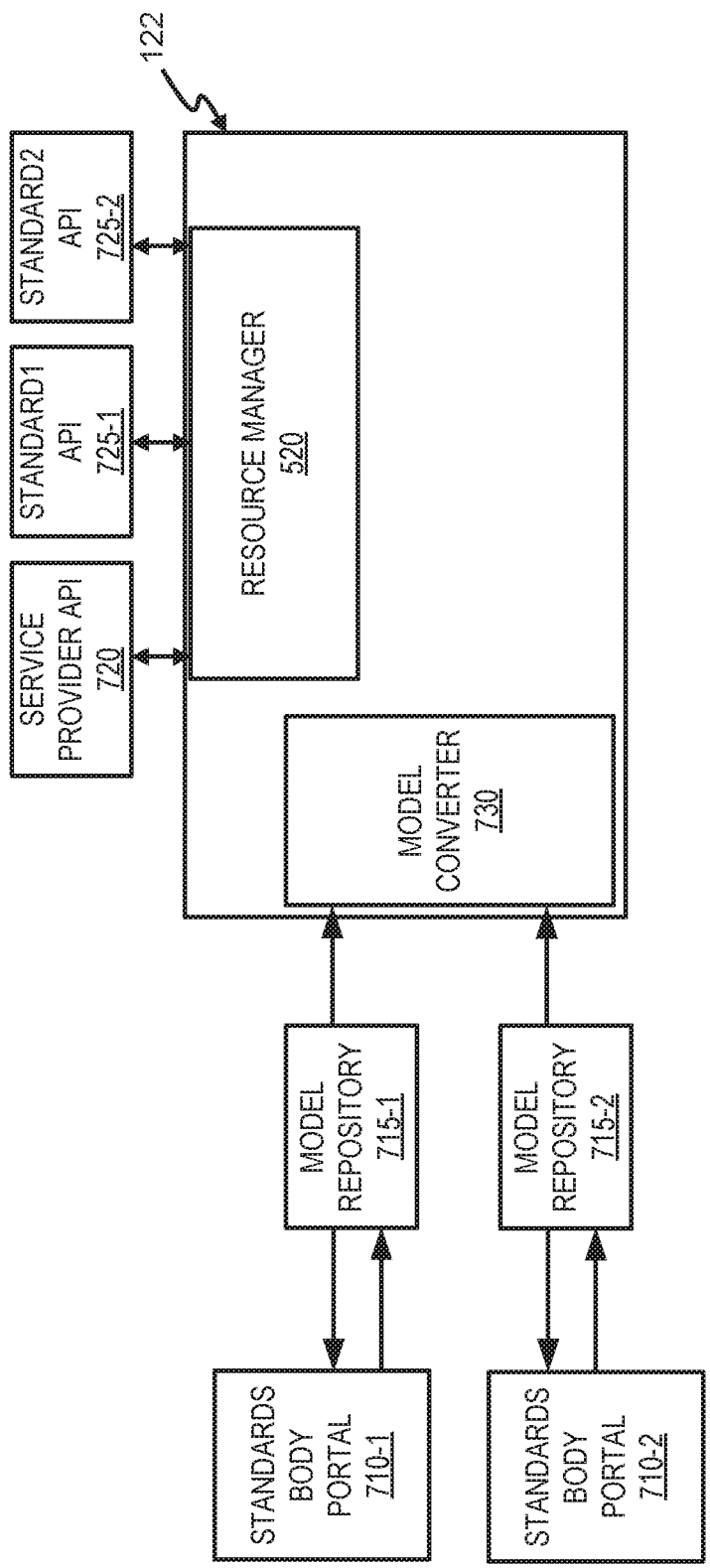
FIG. 7 is a block diagram illustrating communications for sharing a device model among components in a network.

FIG. 7 is a block diagram illustrating communications for sharing a device model among components in a network 700. Network 700 may include data service platform 122, standards body portals 710-1 and 710-2, model repositories 715-1 and 715-2, service provider API layer 720, standard1 API layer 725-1, and standard2 API layer 725-2. In one implementation, a standards body portal 710 and a corresponding model repository 715 may be part of third-party platform 160.

Each standards body portal 710 may include one or more network devices or server devices for an interoperability standards body. In other implementations, standards body portal 710 may be associated with a particular service provider, company, organization, etc. Each of standards body portal 710 may represent a different standards body with different standards for data models. Examples of standards bodies operating standards body portals 710 may include the OPEN CONNECTIVITY FOUNDATION (OCF) or OPEN MOBILE ALLIANCE (OMA), with Lightweight M2M (LWM2M) IP-based smart object (IPSO) standards). Standards body portal 710 may provide a vehicle for submission and approval of a data model by a corresponding standards body.

Each of model repositories 715 may include a data structure or memory for storing approved data models (e.g., approved by a corresponding standards body associated with standards body portal 710). In one implementation, when an approved data model is provided to model repository 715, data service platform 122 may be automatically notified. For example, standards body portal 710 may notify data service platform 122 as a standardized updating service.

As shown in FIG. 7, data services platform 122 may include a model converter 730 and resource manager 520. Model converter 730 may interface with data model repositories 715 of different standards (e.g., model repository 715-2, 715-2, etc.). Upon receiving notification that a data model in one of model repositories 715 is approved, model converter 730 may retrieve the approved model and convert the model back into a capabilities-based model for distribution. For example, model converter 730 may effectively disassemble the approved standard model (obtained from one of data model repositories 715) into various data fields and then map the data fields to corresponding capabilities to form a capabilities-based model. With resource manager 520 providing a generic abstraction of using service provider internal models on a service provider's model format, additional API layers (e.g., API layers 725-1 and 725-2) can be added on top of resource manager 520 to serve the needs of customers who prefer to use other standards. API layers 725-1 and 725-2 may, for example, provide an interface to access the service provider models in standardized formats, such as LWM2M IPSO or OCF model format.

Resource manager 520 may provide customer access to the converted data models via one or more APIs. For example, representational state transfer (RESTful) APIs (e.g., via service provider API layer 720) may be provided to access capabilities-based data models. In other implementations, APIs using OCF or IPSO standards (e.g., via API layers 725-1 and 725-2) may be used to access capabilities-based models.

Figure 8:
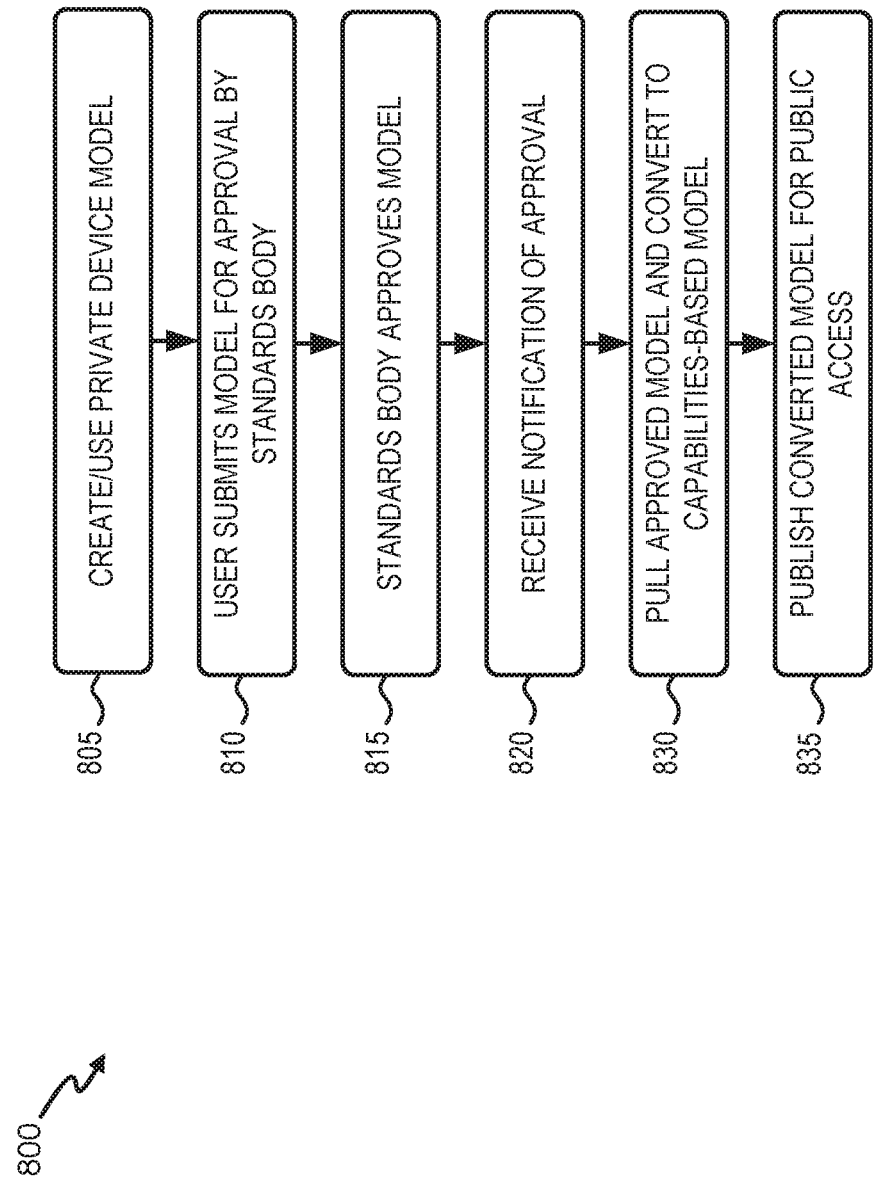
FIG. 8 is a flow diagram illustrating an exemplary process for sharing a device model, according to an implementation described herein.

FIG. 8 is a flow diagram illustrating an exemplary process 800 for sharing a device model. In one implementation, process 800 may be implemented by devices in data service platform 122. In another implementation, process 800 may be implemented by devices in data service platform 122 in conjunction with one or more other devices in network environment 100, such as one or more devices in service network 120.

Process 800 may include creating and using a private device model (block 805). For example, as described in connection with FIG. 6, a customer may create a device model in a developer mode and use the device model privately until deciding to submit the private device model for approval as a standard.

Process 800 may include submitting the private device model to a standards body for approval (block 810), the standards body approving the private device model (block 815), and receiving notification of the approval (block 820). For example, a customer may use end device 150 to submit a private device model to standards body portal 710. The submission may initiate a review by a standards body. A successful review may result in eventual approval of the private model and inclusion in model repository 715. In response to an approval, standards body portal 710 may generate an approval notice, which may be sent to data service platform 122. Data service platform 122 may receive the approval notice.

Process 800 may also include pulling or obtaining the approved model and converting the approved model into a capabilities-based model (block 830) and publishing the converted model for public access (block 835). For example, in response to receiving the approval notice from standards body portal 710, data service platform 122 may retrieve the approved model and convert the approved model into a capabilities-based model consistent with the approved model. As the model is essentially a grouping of capabilities, the conversion is possible by disassembling the standard model to various data fields and then mapping them to the corresponding service provider's capabilities. The converted model may be published in a catalog (e.g., public model catalog 340) for other customers with access to data service platform 122.

Figure 9:
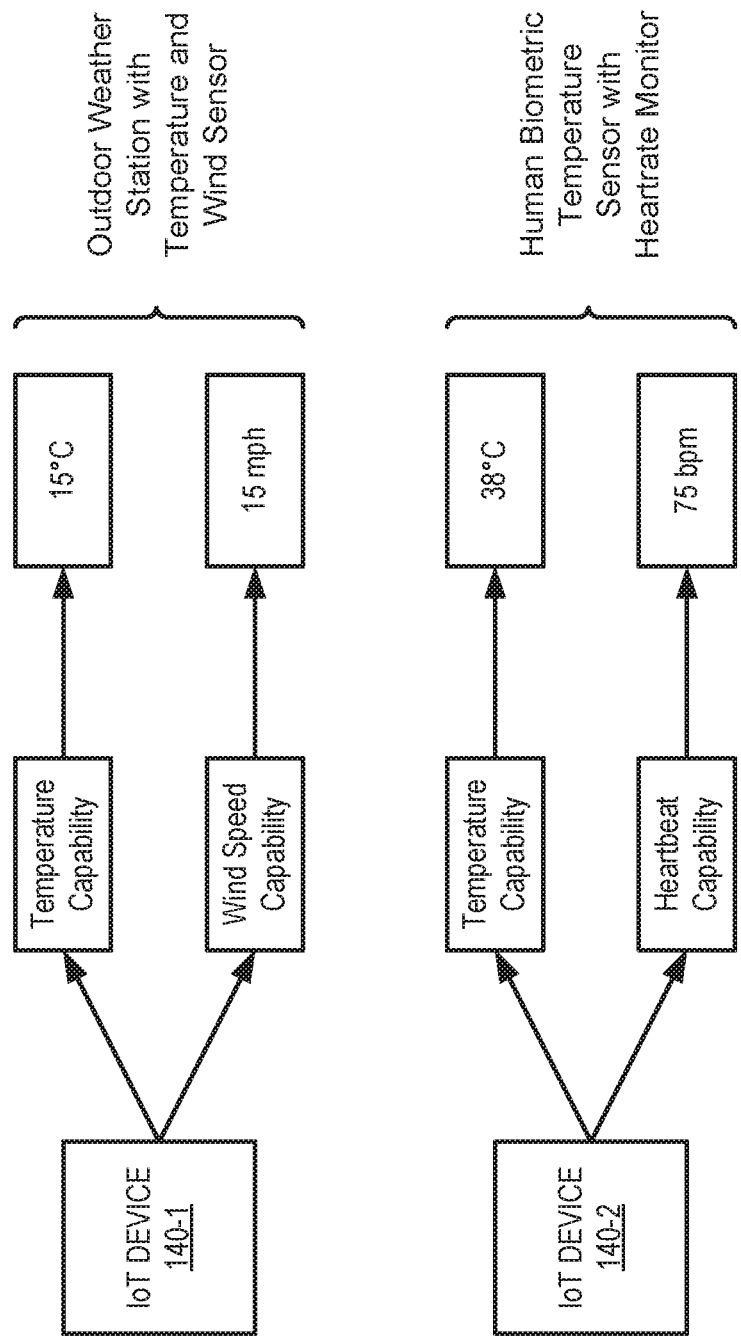
FIG. 9 is a diagram illustrating a use case for a device model, according to implementations described herein.

FIG. 9 provides an illustration of a use case for creating a device model from capabilities, according to an implementation. In the example of FIG. 9, assume a customer is using a developer mode of IoT portal 124 to create device models for two different types of IoT devices 140. A first IoT device 140-1 is assigned a "temperature" capability and a "wind speed" capability (e.g., using capability identifiers selected from capabilities catalog 320). A second IoT device 140-2 is assigned the "temperature" capability and a "heartbeat" capability.

Data generated by IoT device 140-1 may be collected by data service platform 122 and associated with the corresponding "temperature" capability (i.e., 15° C.) and a "wind speed" capability (i.e., 15 miles per hour (mph)). Semantics, such as the association of the "temperature" capability with the "wind speed" capability and the actual data values, lead to a determination (e.g., by analytics 228) that IoT device 140-1 is an outdoor weather station with a thermometer and an anemometer.

Data generated by IoT device 140-2 may be collected by data service platform 122 and associated with the corresponding "temperature" capability (i.e., 38° C.) and a "heartbeat" capability (i.e., 75 beats per minute (bpm)). Semantics, such as the association of the "temperature" capability with the "heartbeat" capability and the actual data values, lead to a determination (e.g., by analytics 228) that IoT device 140-2 is a human biometric sensor with a body temperature sensor and heart rate monitor.

FIG. 10 is a diagram illustrating exemplary physical components of a device 1000. Device 1000 may correspond to network elements depicted in environment 100. Device 1000 may include a bus 1010, a processor 1020, a memory 1030, an input component 1040, an output component 1050, and a communication interface 1060.

Bus 1010 may include a path that permits communication among the components of device 1000. Processor 1020 may include a processor, a microprocessor, or processing logic that may interpret and execute instructions. Memory 1030 may include any type of dynamic storage device that may store information and instructions, for execution by processor 1020, and/or any type of non-volatile storage device that may store information for use by processor 1020.

Software 1035 includes an application or a program that provides a function and/or a process. Software 1035 is also intended to include firmware, middleware, microcode, hardware description language (HDL), and/or other form of instruction. By way of example, with respect to the network elements that include logic to provide the IoT modeling services described above, these network elements may be implemented to include software 1035. Additionally, for example, end device 150 may include software 1035 (e.g., an application to communicate to IoT portal 124, etc.) to perform tasks as described herein.

Input component 1040 may include a mechanism that permits a user to input information to device 1000, such as a keyboard, a keypad, a button, a switch, etc. Output component 1050 may include a mechanism that outputs information to the user, such as a display, a speaker, one or more light emitting diodes (LEDs), etc.

Communication interface 1060 may include a transceiver that enables device 1000 to communicate with other devices and/or systems via wireless communications, wired communications, or a combination of wireless and wired communications. For example, communication interface 1060 may include mechanisms for communicating with another device or system via a network. Communication interface 1060 may include an antenna assembly for transmission and/or reception of radio frequency (RF) signals. For example, communication interface 1060 may include one or more antennas to transmit and/or receive RF signals over the air. Communication interface 1060 may, for example, receive RF signals and transmit them over the air to IoT device 140, and receive RF signals over the air from IoT device 140. In one implementation, for example, communication interface 1060 may communicate with a network and/or devices connected to a network. Alternatively or additionally, communication interface 1060 may be a logical component that includes input and output ports, input and output systems, and/or other input and output components that facilitate the transmission of data to other devices.

Device 1000 may perform certain operations in response to processor 1020 executing software instructions (e.g., software 1035) contained in a computer-readable medium, such as memory 1030. A computer-readable medium may be defined as a non-transitory memory device. A non-transitory memory device may include memory space within a single physical memory device or spread across multiple physical memory devices. The software instructions may be read into memory 1030 from another computer-readable medium or from another device. The software instructions contained in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

Device 1000 may include fewer components, additional components, different components, and/or differently arranged components than those illustrated in FIG. 10. As an example, in some implementations, a display may not be included in device 1000. In these situations, device 1000 may be a "headless" device that does not include input component 1040. As another example, device 1000 may include one or more switch fabrics instead of, or in addition to, bus 1010. Additionally, or alternatively, one or more components of device 1000 may perform one or more tasks described as being performed by one or more other components of device 1000.

According to an implementation described herein a network device may store capability designations associated with consumer Internet-of-Things (IoT) devices and may receive, from a customer device, one or more of the capability designations associated with a first type of IoT device. The network device may receive event data generated by the first type of IoT device and may map the event data to the one or more of the capability designations. The mapping may produce normalized IoT data for the first type of IoT device. The network device may generate semantic information for the normalized IoT data and may assemble a device model for the first type of IoT device. The device model may include the one or more of the capability designations and the semantic information.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 6 and 8, the order of the blocks may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   storing, by a network device, a catalog of capability designations for different types of Internet-of-Things (IoT) devices;
   receiving, by the network device and from a customer device, selection from the catalog of one or more of the capability designations, associated with a first type of IoT device;
   receiving, by the network device and after receiving the selection of the capability designations, event data generated by the first type of IoT device;
   mapping, by the network device, the event data to the one or more of the capability designations, wherein the mapping produces normalized IoT data for the first type of IoT device;
   generating, by the network device, semantic information for the normalized IoT data;
   assembling, by the network device, a data model for the first type of IoT device, wherein the data model includes the one or more of the capability designations and the semantic information and wherein the data model governs how data for the first type of IoT device is at least one of collected, stored, or presented;
   storing, by the network device and in a memory, the data model;
   receiving, by the network device and from a service or organization, an approval indication for the data model; and
   converting, by the network device and after receiving the approval indication, the data model to a public model that is accessible to other customers.

2. The method of claim 1, wherein the converting comprises disassembling the data model to various data fields and mapping the various data fields to capabilities that correspond to the capability designations.

3. The method of claim 1, further comprising:
adding, by the network device, the public model to a catalog listing.

4. The method of claim 1, further comprising:
assigning a network address for the normalized IoT data, wherein the network address includes access restrictions.

5. The method of claim 1, further comprising:
receiving, by the network device, additional event data generated by the first type of IoT device;
mapping, by the network device, the additional event data to the one or more of the capability designations;
generating, by the network device, updated semantic information for the normalized IoT data; and
revising, by the network device, the data model based on the updated semantic information.

6. The method of claim 1, wherein the event data generated by the first type of IoT device includes the one or more of the capability designations.

7. The method of claim 1, wherein storing the data model further includes storing the data model to a customer account accessible to only a customer.

8. The method of claim 1, further comprising:
receiving, by the network device and from the customer device, another selection from the catalog of one or more of the capability designations associated with a second type of IoT device;
receiving, by the network device, event data generated by the second type of IoT device;
mapping, by the network device, the event data to the one or more of the capability designations associated with the second type of IoT device, wherein the mapping produces normalized IoT data for the second type of IoT device;
generating, by the network device, other semantic information for the normalized IoT data for the second type of IoT device;
assembling, by the network device, another data model for the second type of IoT device, wherein the other data model includes the one or more of the capability designations associated with the second type of IoT device and the other semantic information; and
storing, by the network device, the other data model associated with the second type of IoT device.

9. The method of claim 8, wherein at least one of the capability designations associated with the first type of IoT device and the capability designations associated with the second type of IoT device are the same.

10. One or more network devices, comprising:
a memory for storing instructions; and
one or more processors configured to execute the instructions to:
store a catalog of capability designations for different types of Internet-of-Things (IoT) devices;
receive, from a customer device, selection from the catalog of one or more of the capability designations, associated with a first type of IoT device;
receive, after receiving the selection of the capability designations, event data generated by the first type of IoT device;
map the event data to the one or more of the capability designations, wherein the mapping produces normalized IoT data for the first type of IoT device;
generate semantic information for the normalized IoT data;
assemble a data model for the first type of IoT device, wherein the data model includes the one or more of the capability designations and at least some of the semantic information and wherein the data model governs how data for the first type of IoT device is at least one of collected, stored, or presented;
store in the memory the data model;
receive, from a service or organization, an approval indication for the data model; and
convert, after receiving the approval indication, the data model to a public model that is accessible to other customers.

11. The one or more network devices of claim 10, wherein, when converting the data model, the one or more processors are further configured to execute the instructions to:
disassemble the data model to various data fields and map the various data fields to capabilities that correspond to the capability designations.

12. The one or more network devices of claim 10, wherein the one or more processors are further configured to execute the instructions to:
add the public model to a catalog listing.

13. The one or more network devices of claim 10, wherein the one or more processors are further configured to execute the instructions to:
assign a network address for the normalized IoT data, wherein the network address includes access restrictions.

14. The one or more network devices of claim 10, wherein the one or more processors are further configured to execute the instructions to:
receive additional event data generated by the first type of IoT device;
map the additional event data to the one or more of the capability designations;
generate updated semantic information for the normalized IoT data; and
revise the data model based on the updated semantic information.

15. The one or more network devices of claim 10, wherein the event data generated by the first type of IoT device includes one or more of the capability designations.

16. A non-transitory computer-readable medium containing instructions executable by at least one processor, the computer-readable medium comprising one or more instructions to cause the at least one processor to:
store a catalog of capability designations for different types of Internet-of-Things (IoT) devices;
receive, from a customer device, selection from the catalog of one or more of the capability designations, associated with a first type of IoT device;
receive, after receiving the selection of the capability designations, event data generated by the first type of IoT device;
map the event data to the one or more of the capability designations, wherein the mapping produces normalized IoT data for the first type of IoT device;
generate semantic information for the normalized IoT data;
assemble a data model for the first type of IoT device, wherein the data model includes the one or more of the capability designations and the semantic information and wherein the data model governs how data for the first type of IoT device is at least one of collected, stored, or presented;
store in a memory the data model;
receive, from a service or organization, an approval indication for the data model; and convert, after receiving the approval indication, the data model to a public model that is accessible to other customers.

17. The non-transitory computer-readable medium claim 16, further comprising one or more instructions to cause the at least one processor to:
add the public model to a catalog listing.

18. The non-transitory computer-readable medium claim 16, wherein the instructions to store the data model further include instructions to store the data model to a customer account.

19. The non-transitory computer-readable medium claim 16, further comprising one or more instructions to cause the at least one processor to:
receive, from the customer device, selection from the catalog of one or more of the capability designations associated with a second type of IoT device;
receive event data generated by the second type of IoT device;
map the event data to the one or more of the capability designations associated with the second type of IoT device, wherein the mapping produces normalized IoT data for the second type of IoT device;
generate other semantic information for the normalized IoT data for the second type of IoT device;
assemble another data model for the second type of IoT device, wherein the other data model includes the one or more of the capability designations associated with the second type of IoT device and the other semantic information; and
storing the other data model associated with the second type of IoT device.

20. The non-transitory computer-readable medium claim 19, wherein at least one of the capability designations associated with a first type of IoT device and the capability designations associated with the second type of IoT device are the same.

* * * * *